(12) United States Patent
Singh et al.

(10) Patent No.: US 12,022,758 B2
(45) Date of Patent: Jul. 2, 2024

(54) SWATH ACQUISITION SYSTEM FOR AN AGRICULTURAL VEHICLE AND AN AGRICULTURAL IMPLEMENT

(71) Applicant: CNH Industrial America LLC, New Holland, PA (US)

(72) Inventors: Aditya Singh, Bolingbrook, IL (US); Peter Henne, Morris, IL (US); Craig William Pavlich, Glen Ellyn, IL (US); Navneet Gulati, Naperville, IL (US); Daniel Geiyer, Bolingbrook, IL (US); Phillip Duane Dix, Westmont, IL (US)

(73) Assignee: CNH Industrial America LLC, New Holland, PA (US)

( * ) Notice: Subject to any disclaimer, the term of this patent is extended or adjusted under 35 U.S.C. 154(b) by 298 days.

(21) Appl. No.: 17/505,357

(22) Filed: Oct. 19, 2021

(65) Prior Publication Data

US 2022/0124957 A1 Apr. 28, 2022

Related U.S. Application Data

(60) Provisional application No. 63/105,512, filed on Oct. 26, 2020.

(51) Int. Cl.
*A01B 69/00* (2006.01)
*A01B 69/04* (2006.01)
*A01B 79/00* (2006.01)
*G05D 1/00* (2006.01)

(52) U.S. Cl.
CPC .......... *A01B 69/004* (2013.01); *A01B 69/008* (2013.01); *A01B 79/005* (2013.01); *G05D 1/0016* (2013.01); *G05D 1/0223* (2013.01)

(58) Field of Classification Search
None
See application file for complete search history.

(56) References Cited

U.S. PATENT DOCUMENTS

| | | | |
|---|---|---|---|
| 6,865,465 | B2 | 3/2005 | McClure |
| 7,509,199 | B2 | 3/2009 | Rekow |
| 7,835,832 | B2 | 11/2010 | Macdonald et al. |
| 7,860,628 | B2 | 12/2010 | Lange |
| 8,112,201 | B2 | 2/2012 | Aral |
| 8,116,977 | B2 | 2/2012 | Aral et al. |

(Continued)

FOREIGN PATENT DOCUMENTS

WO 2013083311 6/2013

*Primary Examiner* — Tamara L Weber
(74) *Attorney, Agent, or Firm* — Rickard DeMille; Rebecca Henkel; Peter K. Zacharias

(57) ABSTRACT

A method for controlling an agricultural vehicle includes receiving, via a processor, a first signal from a user interface indicative of a value of at least one parameter. The method also includes determining, via the processor, a path of the agricultural vehicle toward a guidance swath based at least in part on the at least one parameter. In addition, the method includes outputting, via the processor, a second signal to a display of the user interface indicative of instructions to present a graphical representation of the path of the agricultural vehicle. Furthermore, the method includes controlling the agricultural vehicle, via the processor, based at least in part on the at least one parameter upon receiving at least a third signal from the user interface indicative of acceptance of the value of the at least one parameter.

20 Claims, 4 Drawing Sheets

(56) References Cited

U.S. PATENT DOCUMENTS

| | | | |
|---|---|---|---|
| 8,190,364 B2 | 5/2012 | Rekow | |
| 9,020,757 B2 | 4/2015 | Peake et al. | |
| 9,417,632 B2 | 8/2016 | Peake et al. | |
| 9,454,153 B2 | 9/2016 | Sights et al. | |
| 9,804,603 B1 | 10/2017 | Yegerlehner | |
| 9,826,673 B1 | 11/2017 | Ray et al. | |
| 10,019,010 B2 | 7/2018 | Peake et al. | |
| 10,031,525 B2 | 7/2018 | Dix et al. | |
| 2015/0342110 A1* | 12/2015 | Peake | A01B 79/005 701/50 |
| 2017/0147005 A1 | 5/2017 | Ramm et al. | |
| 2018/0084710 A1 | 3/2018 | Lawson | |

* cited by examiner

SWATH ACQUISITION SYSTEM FOR AN AGRICULTURAL VEHICLE AND AN AGRICULTURAL IMPLEMENT

CROSS-REFERENCE TO RELATED APPLICATION

This application claims priority from and the benefit of U.S. Provisional Application Ser. No. 63/105,512, entitled "Swath Acquisition System for an Agricultural Vehicle and an Agricultural Implement", filed Oct. 26, 2020, which is hereby incorporated by reference in its entirety.

BACKGROUND

The present disclosure relates generally to a swath acquisition system for an agricultural vehicle and an agricultural implement.

Certain agricultural vehicles, such as tractors or other prime movers, may be controlled by a control system (e.g., without operator input, with limited operator input, etc.) during certain phases of operation. For example, a controller may instruct a steering control system and/or a speed control system of the agricultural vehicle to automatically or semi-automatically guide the agricultural vehicle along a guidance swath within a field. Often, the agricultural vehicle is coupled to an agricultural implement, and the agricultural vehicle may move the agricultural implement along the guidance swath line. An operator may manually direct (e.g., steer) the agricultural vehicle to the guidance swath and align the agricultural vehicle and the agricultural implement with the guidance swath before engaging the control system. Unfortunately, the process of acquiring the guidance swath manually may be inefficient, thereby increasing fuel consumption and/or delaying agricultural operations.

BRIEF DESCRIPTION

In certain embodiments, a controller may include a memory and a processor for determining a swath acquisition path of an agricultural vehicle based on a target implement path of an associated implement. The controller may determine a maximum implement curvature of the implement based on a speed of the implement and a maximum implement turn rate of the implement. The implement may be towed by the agricultural vehicle. The controller may determine a target implement path from a current position of the implement to a guidance swath. The target implement path may align the implement with the guidance swath at an end of the target implement path. Moreover, the target implement path may include the maximum implement curvature for a greatest percentage of the target implement path that enables the implement to reach and align with the guidance swath. The controller may determine a swath acquisition path of the agricultural vehicle from a current position of the agricultural vehicle to the guidance swath based on the target implement path. The swath acquisition path may align the implement with the guidance swath at an end of the swath acquisition path.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
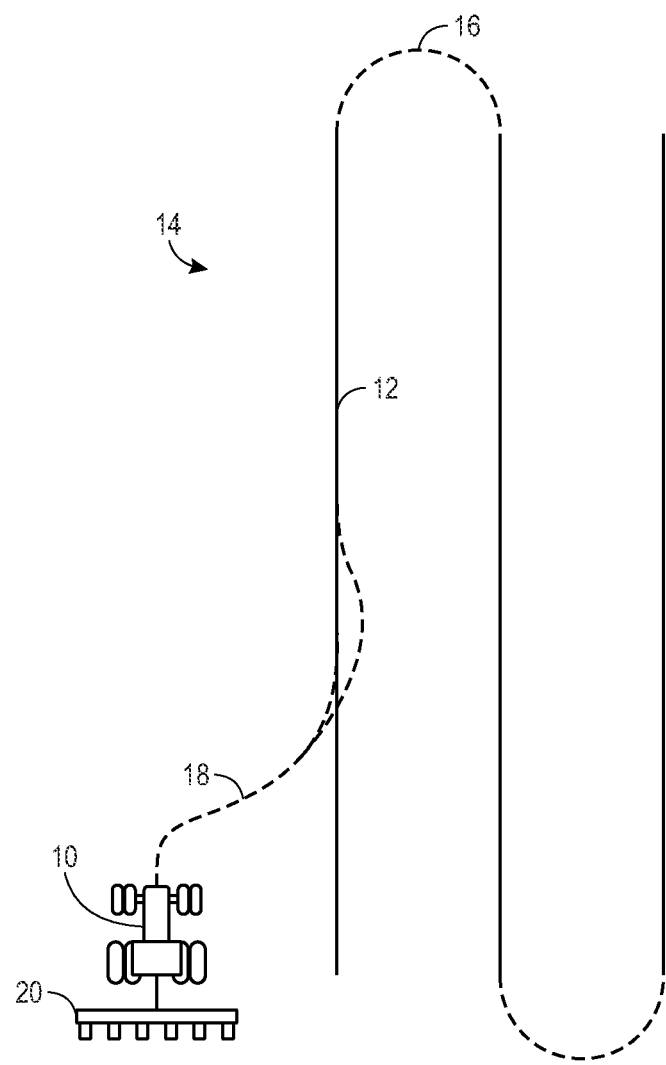
FIG. 1 is a top view of an embodiment of an agricultural vehicle and an agricultural implement, in which the agricultural vehicle is configured to engage and to follow a guidance swath through a field.

Turning to the drawings, FIG. 1 is a top view of an embodiment of an agricultural vehicle 10 and an agricultural implement 20, in which the agricultural vehicle 10 is configured to engage and to follow a guidance swath 12 through a field 14. In the illustrated embodiment, the agricultural vehicle 10 includes a control system configured to automatically guide the agricultural vehicle 10 and the implement 20 along the guidance swath 12. In certain embodiments, the guidance swath 12 may be established by storing data points associated with locations of an agricultural vehicle as the agricultural vehicle moves through the field. In further embodiments, the guidance swath 12 may be established by drawing the guidance swath on an electronic map of the field. Once the guidance swath 12 is established, the control system may automatically guide the agricultural vehicle 10 and the implement 20 along the guidance swath 12 without input from an operator. In certain embodiments, the control system may also automatically guide the agricultural vehicle 10 and the implement 20 around headland turns 16 between segments of the guidance swath 12. However, in alternative embodiments, the operator may manually control the agricultural vehicle 10 during the headland turns.

Prior to initiating agricultural operations, the agricultural vehicle 10 and the implement 20 may be positioned remote from the guidance swath 12. The implement 20 may be attached to a rear portion of the agricultural vehicle 10, for example by a hitch. The agricultural vehicle 10 may move (e.g., tow) the implement 20 to bring the implement onto the guidance swath 12 and to align the implement 20 with the guidance swath 12. In certain embodiments, the control system automatically directs the agricultural vehicle 10 along a swath acquisition path 18 to the guidance swath 12 such that the implement 20 aligns with the guidance swath 12 as agricultural operations are initiated.

Initially, the agricultural vehicle 10 and the implement 20 may be located remote to the guidance swath 12. The control system may determine the swath acquisition path 18 based on certain properties and parameters associated with the agricultural vehicle 10 and the implement 20. In certain embodiments, the control system may determine the swath acquisition path based on a target implement path, and the control system may determine the target implement path based on a maximum turn rate of the agricultural implement 20 and a speed of the agricultural vehicle/implement.

The control system may determine the swath acquisition path 18 based on information indicative of properties associated with the agricultural vehicle 10 and the implement 20. These properties may include a maximum turn rate of the agricultural vehicle 10, a maximum turn rate of the implement, dimensions of the agricultural vehicle 10, dimensions of the implement, a maximum speed of the agricultural vehicle 10, an initial position and orientation of the agricultural vehicle 10, an initial position and orientation of the implement, other suitable parameter(s), or a combination thereof. The control system may receive one or more of the foregoing properties from various source(s), and/or the control system may store one or more of the foregoing properties (e.g., within a memory of a controller). For example, the control system may receive one or more of the foregoing properties from an electronic storage unit associated with the agricultural vehicle 10, the implement 20, or both, having the respective properties saved thereon, and/or the control system may receive one or more of the foregoing properties from a user interface.

In some embodiments, the control system may determine the swath acquisition path 18 for the agricultural vehicle based on a determined swath acquisition path for the implement 20. That is, the control system may use the received parameters to calculate a swath acquisition path for the implement 20 to acquire and align the guidance swath efficiently and calculate the swath acquisition path 18 for the agricultural vehicle consecutively based on the calculates swath acquisition path for the implement 20. The described systems and methods may enable the implement 20 to acquire the guidance swath with the least down track time using a highest curvature and speed of the agricultural vehicle using the received parameters.

In certain embodiments, the control system may receive such parameters associated with calculation of the swath acquisition path 18 from an operator. For example, the control system may receive an aggressiveness to acquire the guidance swath 12 as a parametric value. The control system may use a user interface to receive the aggressiveness value from the operator. Moreover, the control system may use the received aggressiveness value in determining the swath acquisition path 18. In such embodiments, the control system may determine the swath acquisition path 18 based on the received properties from the storage unit and also the received aggressiveness value from the operator.

In different embodiments, the aggressiveness value may be indicative of a slew rate or a time period for the agricultural vehicle 10 to guide the implement 20 to the guidance swath 12. The control system may calculate other parameters associated with swath acquisition path to determine or adjust the swath acquisition path 18 based at least in part on the received aggressiveness value. The calculated parameters may be described in detail below.

The control system may also present a visual representation of the swath acquisition path 18 to the operator. The visual representation may include the embodiment of FIG. 1, where the swath acquisition path 18 may be determined based in part on the received properties of the agricultural vehicle 10 and the implement 20, and based in part the aggressiveness and the calculated parameters. The calculated parameters may include an initial turn rate of the agricultural vehicle 10, an approach angle of the agricultural vehicle 10 toward the guidance swath 12, a swath turn rate of the agricultural vehicle 10, and an overshoot of the agricultural vehicle 10 with respect to the guidance swath 12 after initially crossing the guidance swath 12, among other parameters.

In certain embodiments, the operator may adjust the calculated overshoot of the agricultural vehicle 10 to fine tune the overshoot. In this way, the control system may adjust the swath acquisition path 18 based on the overshoot adjustments. Once the displayed swath acquisition path is acceptable to the operator, the operator may accept the parameter(s) (e.g., by engaging automatic control of the agricultural vehicle 10). The control system may then control the agricultural vehicle 10 such that the agricultural vehicle 10 is directed along the swath acquisition path 18. As such, the agricultural vehicle 10 may get the implement 20 on the guidance swath 12 with the least down track distance.

In certain embodiments, the control system includes a user interface having a display that provides the visual representation of the swath acquisition path 18. The control system may also include a controller communicatively coupled to the user interface. The user interface is configured to output a first signal to the controller including a value indicative of the aggressiveness value, and the controller is configured to determine a path of the implement 20 toward the guidance swath 12 based in part on the received aggressiveness value. The controller may then determine a path of the agricultural vehicle 10 toward the guidance swath 12, based in part, on the determined implement 20 path.

In some embodiments, the controller is configured to output a second signal to the display indicative of instructions to display a graphical representation of the swath acquisition path 18. Accordingly, an operator may vary certain parameters, using the user interface, until the path shown on the display is acceptable to the operator (e.g., aggressiveness, overshoot, etc.). Once an acceptable path is established, the operator may accept the value of the at least one parameter (e.g., by engaging automatic control of the agricultural vehicle 10 via the user interface, by instructing the control system to update the swath acquisition path, etc.).

In certain embodiments, the controller may then control the agricultural vehicle 10 upon receiving a third signal from the user interface indicating acceptance of the value of the determined swath acquisition path 18. Because the control system enables the operator to visualize the effect of varying the aggressiveness of swath path acquisition, the operator may select aggressiveness to establish an efficient swath acquisition path (e.g., a swath acquisition path that reduces fuel consumption, reduces swath acquisition time for the implement 20, etc.). In some embodiments, the operator may desire a less aggressive swath acquisition path compared to the most aggressive swath acquisition path parameters using the received properties of the vehicle. For example, the operator may desire a least implement down track time while maintaining a reduced lateral load on the vehicle. The operator may adjust the aggressiveness and/or overshoot settings to determine the optimal aggressiveness value and/ or optimal overshoot value for the agricultural vehicle 10 and the implement 20 to acquire the guidance swath 12.

Figure 2:
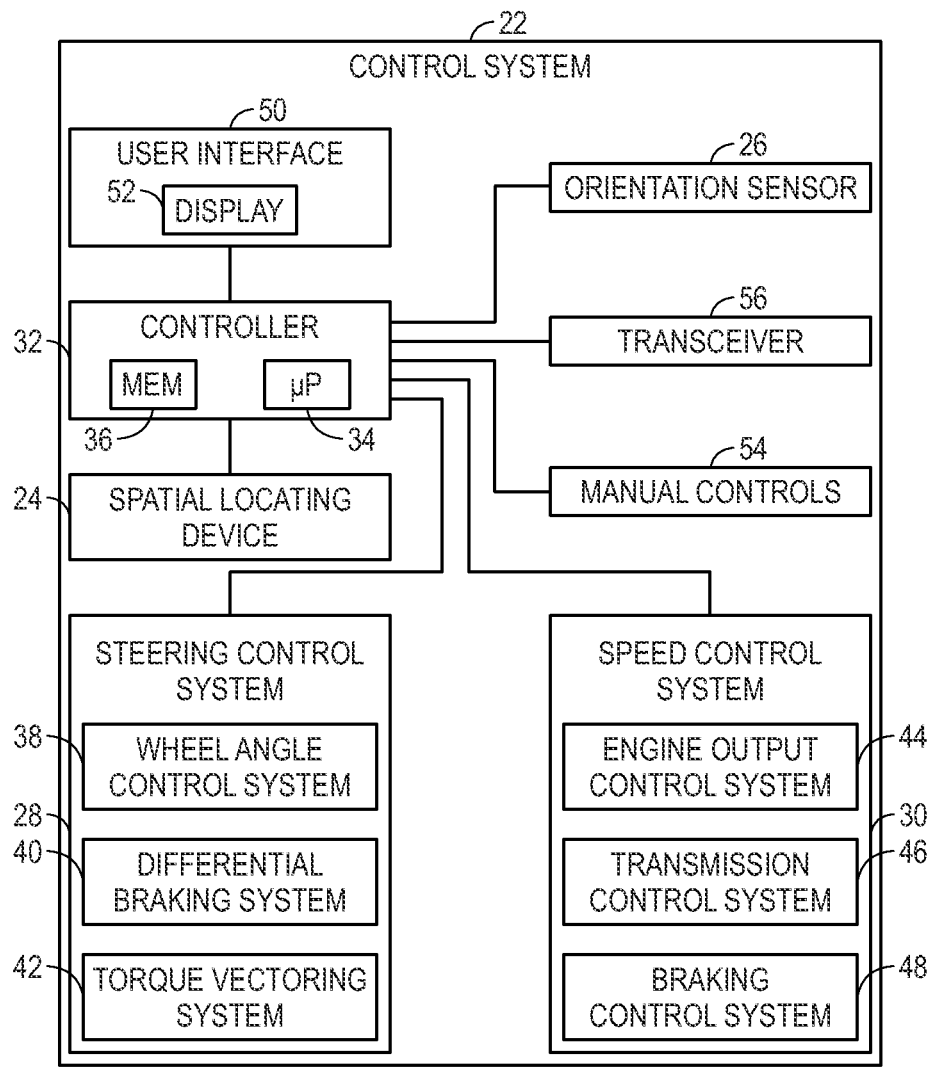
FIG. 2 is a block diagram of an embodiment of a control system that may be employed within the agricultural vehicle of FIG. 1.

FIG. 2 is a block diagram of an embodiment of a control system 22 that may be employed within the agricultural vehicle of FIG. 1. In the illustrated embodiment, the control system 22 includes a spatial locating device 24, which is mounted to the agricultural vehicle and configured to determine/facilitate determination of a position and, in certain embodiments, a velocity of the agricultural vehicle. The spatial locating device 24 may include any suitable system configured to measure the position and, in certain embodiments, velocity of the agricultural vehicle, such as a global positioning system (GPS) receiver, for example. In certain embodiments, the spatial locating device 24 may be configured to measure the position and, in certain embodiments, velocity of the agricultural vehicle relative to a fixed point within a field (e.g., via a fixed radio transceiver). Accordingly, the spatial locating device 24 may be configured to measure the position and, in certain embodiments, velocity of the agricultural vehicle relative to a fixed global coordinate system (e.g., via the GPS receiver) or a fixed local coordinate system. In some embodiments, the spatial locating device 24 or another spatial locating device may be mounted to the agricultural implement and configured to determine/facilitate determination of a position and, in certain embodiments, a velocity of the agricultural implement.

In addition, the control system 22 includes an orientation sensor 26 configured to determine/facilitate determination of a pitch angle, a yaw angle, a roll angle, or a combination thereof, of the agricultural vehicle. For example, the orientation senor 26 may include a gyroscope or other sensor configured to monitor the orientation of the agricultural vehicle. In certain embodiments, the orientation sensor 26 is also configured to determine a pitch rate, a yaw rate, a roll rate, or a combination thereof. Furthermore, in certain embodiments, the orientation sensor or another orientation sensor may be mounted to the agricultural implement and configured to determine/facilitate determination of a pitch angle, a yaw angle, a roll angle, a pitch rate, a yaw rate, a roll rate, or a combination thereof, of the agricultural implement.

In the illustrated embodiment, the control system 22 includes a steering control system 28 configured to control a direction of movement of the agricultural vehicle, and a speed control system 30 configured to control a speed of the agricultural vehicle. In addition, the control system 22 includes a controller 32 communicatively coupled to the spatial locating device 24, to the orientation sensor 26, to the steering control system 28, and to the speed control system 30. The controller 32 is configured to automatically control the agricultural vehicle during swath acquisition and while the agricultural vehicle is moving along the guidance swath 12, thereby enhancing the efficiency of agricultural operations.

In certain embodiments, the controller 32 is an electronic controller having electrical circuitry configured to process data from the spatial locating device 24, the orientation sensor 26, other components of the control system 22, or a combination thereof. In the illustrated embodiment, the controller 32 include a processor, such as the illustrated microprocessor 34, and a memory device 36. The controller 32 may also include one or more storage devices and/or other suitable components. The processor 34 may be used to execute software, such as software for controlling the agricultural vehicle, software for displaying a swath acquisition path, and so forth. Moreover, the processor 34 may include multiple microprocessors, one or more "general-purpose" microprocessors, one or more special-purpose microprocessors, and/or one or more application specific integrated circuits (ASICS), or some combination thereof. For example, the processor 34 may include one or more reduced instruction set (RISC) processors.

The memory device 36 may include a volatile memory, such as random access memory (RAM), and/or a nonvolatile memory, such as read-only memory (ROM). The memory device 36 may store a variety of information and may be used for various purposes. For example, the memory device 36 may store processor-executable instructions (e.g., firmware or software) for the processor 34 to execute, such as instructions for controlling the agricultural vehicle, instructions for displaying a swath acquisition path, and so forth. The storage device(s) (e.g., nonvolatile storage) may include ROM, flash memory, a hard drive, or any other suitable optical, magnetic, or solid-state storage medium, or a combination thereof. The storage device(s) may store data (e.g., agricultural vehicle properties, agricultural implement properties, swath acquisition path parameter(s), etc.), instructions (e.g., software or firmware for controlling the agricultural vehicle, etc.), and any other suitable data.

In the illustrated embodiment, the steering control system 28 includes a wheel angle control system 38, a differential braking system 40, and a torque vectoring system 42. The wheel angle control system 38 may automatically rotate one or more wheels and/or tracks of the agricultural vehicle (e.g., via hydraulic actuators) to steer the agricultural vehicle along a desired route (e.g., along the guidance swath, along the swath acquisition path, etc.). By way of example, the wheel angle control system 38 may rotate front wheels/tracks, rear wheels/tracks, and/or intermediate wheels/tracks of the agricultural vehicle, either individually or in groups. The differential braking system 40 may independently vary the braking force on each lateral side of the agricultural vehicle to direct the agricultural vehicle along a path. Similarly, the torque vectoring system 42 may differentially apply torque from an engine to wheels and/or tracks on each lateral side of the agricultural vehicle, thereby directing the agricultural vehicle along a path. While the illustrated steering control system 28 includes the wheel angle control system 38, the differential braking system 40, and the torque vectoring system 42, other embodiments may include one or two of these systems, in any suitable combination. Furthermore, certain embodiments may include a steering control system 28 having other and/or additional systems to facilitate directing the agricultural vehicle along a path through the field.

In the illustrated embodiment, the speed control system 30 includes an engine output control system 44, a transmission control system 46, and a braking control system 48. The engine output control system 44 is configured to vary the output of the engine to control the speed of the agricultural vehicle. For example, the engine output control system 44 may vary a throttle setting of the engine, a fuel/air mixture of the engine, a timing of the engine, other suitable engine parameters to control engine output, or a combination thereof. In addition, the transmission control system 46 may adjust gear selection within/gear ratio of a transmission to control the speed of the agricultural vehicle. Furthermore, the braking control system 48 may adjust braking force, thereby controlling the speed of the agricultural vehicle. While the illustrated speed control system 30 includes the engine output control system 44, the transmission control system 46, and the braking control system 48, other embodiments may include one or two of these systems, in any suitable combination. Furthermore, certain embodiments may include a speed control system 30 having other and/or additional systems to facilitate adjusting the speed of the agricultural vehicle.

In certain embodiments, the control system 22 may also control operation of the agricultural implement coupled to the agricultural vehicle. For example, the control system may include an implement control system/implement controller configured to control a steering angle of the implement (e.g., via an implement steering control system having a wheel angle control system and/or a differential braking system) and/or a speed of the agricultural vehicle/implement (e.g., via an implement speed control system having a braking control system). In such embodiments, the control system 22 may be communicatively coupled to a control system/controller on the implement via a communication network, such as a controller area network (CAN bus).

In the illustrated embodiment, the control system 22 includes a user interface 50 communicatively coupled to the controller 32. The user interface 50 is configured to selectively instruct the controller 32 to automatically control the agricultural vehicle based on operator input. For example, the operator may position the agricultural vehicle proximate to a guidance swath and then engage automatic control via input to the user interface 50. The controller 32, in turn, may direct the agricultural vehicle toward the guidance swath (e.g., by providing instructions to the steering control system 28, the speed control system 30, the implement control system/implement controller, or a combination thereof). In certain embodiments, the user interface includes a display 52 configured to present information to the operator, such as a graphical representation of the guidance swath, a graphical representation of the swath acquisition path, a visual representation of certain parameter(s), or a combination thereof. In addition, as discussed in detail below, the user interface 50 (e.g., via the display 52, via other controls, etc.) may enable the operator to input value(s) of certain parameter(s), thereby controlling the visual representation of the swath acquisition path.

In certain embodiments, the user interface 50 is configured to output a first signal indicative of a value of at least one swath acquisition parameter (e.g., aggressiveness, overshoot, etc.) and the controller 32 is configured to determine a path of the implement 20 toward the guidance swath based at least in part on the at least one parameter. Then, the controller 32 is configured to determine the swath acquisition path of the agricultural vehicle toward the guidance swath based at least in part on the determined path of the implement. In addition, the controller 32 is configured to output a second signal to the display 52 indicative of instructions to present a graphical representation of the swath acquisition path. Furthermore, the controller 32 is configured to control the agricultural vehicle, and in certain embodiments the agricultural implement, based at least in part on the swath acquisition path (e.g., upon receiving a third signal from the user interface 50 indicative of acceptance of the swath acquisition path).

In certain embodiments, the controller 32 is configured to determine the swath acquisition path by simulating movement of the agricultural vehicle and the agricultural implement using guidance algorithm(s) (e.g., including guidance, navigation, and control algorithm(s), a numerical integrator, etc.), and the controller 32 is configured to control the agricultural vehicle and, in certain embodiments, the agricultural implement, using the guidance algorithm. Because the same guidance algorithm is used to simulate movement of the agricultural vehicle/implement and to control movement of the agricultural vehicle/implement, the accuracy of the graphical representation of the swath acquisition path may be enhanced, as compared to using separate guidance algorithms for simulation and control.

In certain embodiments, the controller 32 is also configured to output a signal to the display 52 indicative of instructions to present a graphical representation of the path of the implement. Displaying the path of the implement may enable the operator to select value(s) of certain parameter(s) (e.g., aggressiveness value, overshoot value, etc.) that establish a swath acquisition path of the agricultural vehicle that quickly and accurately places the implement on the guidance swath and aligns the agricultural implement with the guidance swath, thereby increasing the efficiency of the swath acquisition process.

In the illustrated embodiment, the control system 22 includes manual controls 54 configured to enable an operator to control the agricultural vehicle while automatic control is disengaged. The manual controls 54 may include manual steering control, manual transmission control, manual braking control, or a combination thereof, among other controls. In the illustrated embodiment, the manual controls 54 are communicatively coupled to the controller 32. The controller 32 is configured to disengage automatic control of the agricultural vehicle upon receiving a signal indicative of manual control of the agricultural vehicle. Accordingly, if an operator controls the agricultural vehicle manually, the automatic swath acquisition or swath following process terminates, thereby restoring control of the agricultural vehicle to the operator.

In the illustrated embodiment, the control system 22 includes a transceiver 56 communicatively coupled to the controller 32. In certain embodiments, the transceiver 56 is configured to establish a communication link with a corresponding transceiver of a base station, thereby facilitating communication between the base station and the control system of the agricultural vehicle. For example, the base station may include a user interface that enables a remote operator to provide instructions to the control system (e.g., instructions to initiate automatic control of the agricultural vehicle, instructions to direct the agricultural vehicle along a path, etc.). The user interface may also enable a remote operator to provide data to the control system (e.g., the parameter(s) for establishing the swath acquisition path, data associated with field conditions, data associated with the guidance swath, etc.). The transceiver 56 may operate at any suitable frequency range within the electromagnetic spectrum. For example, in certain embodiments, the transceiver 56 may broadcast and receive radio waves within a frequency range of about 1 GHz to about 10 GHz. In addition, the transceiver 56 may utilize any suitable communication protocol, such as a standard protocol (e.g., Wi-Fi, Bluetooth, etc.) or a proprietary protocol.

Figure 3:
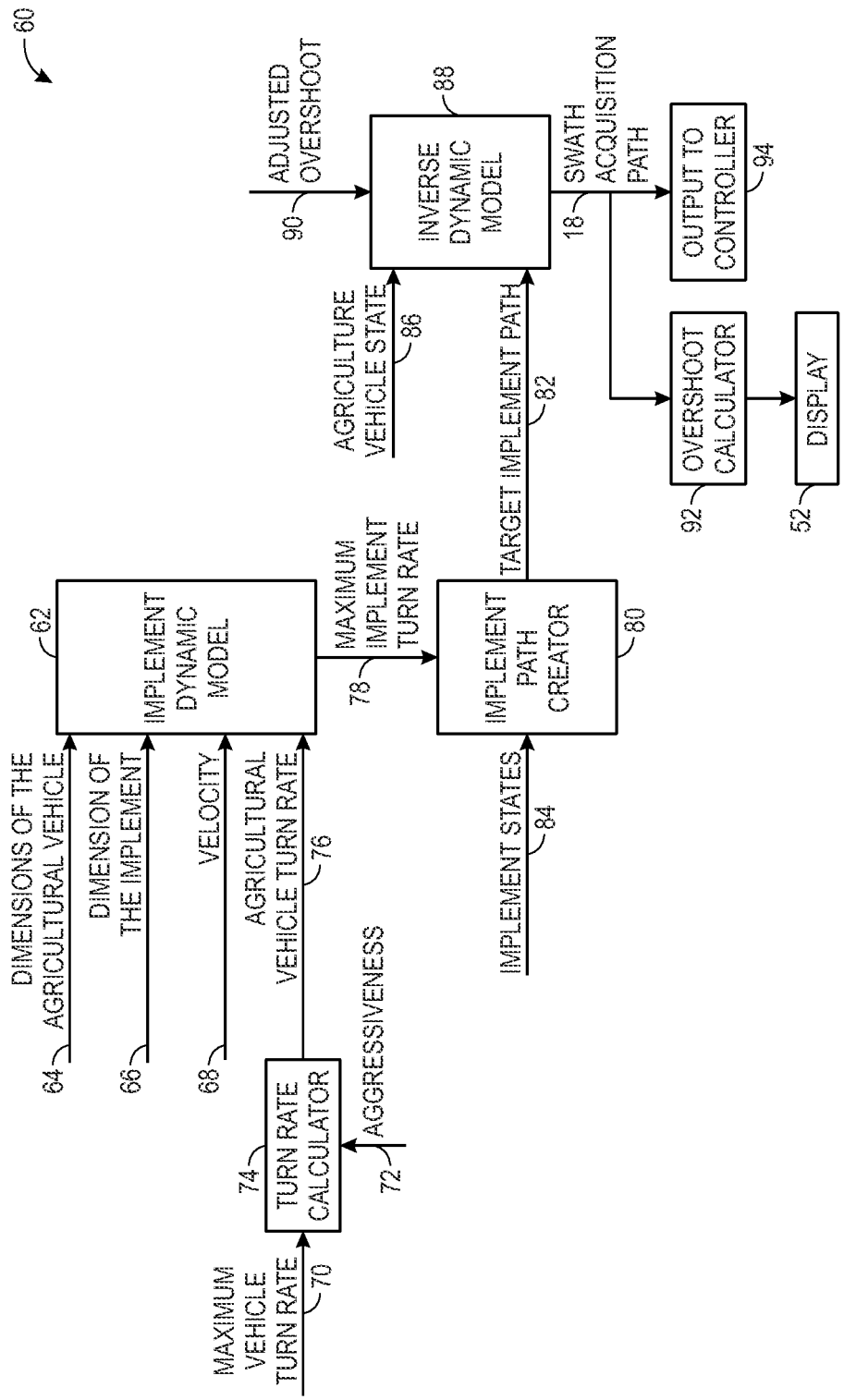
FIG. 3 is a process flow diagram of an embodiment of a process associated with the control system of FIG. 2.

FIG. 3 is process flow diagram of an embodiment of a process 60 associated with the control system of FIG. 2, in which the process is configured to determine the swath acquisition path. In embodiments discussed hereinafter, the control system may use the controller, and the controller, in turn, may use the microprocessor and/or the memory to carry out the process 60 of FIG. 3. Different components or combination(s) of components (e.g., controller(s), processor(s), etc.) may be used in different embodiments to execute the process 60. After determining the swath acquisition path 18, the controller may guide the agricultural vehicle along the swath acquisition path to bring the implement 20 onto the guidance swath 12, as described below. In some embodiments, the controller may also adjust the swath acquisition path 18 during movement of the agricultural vehicle toward the guidance swath 12 by using the process 60.

In certain embodiments, the controller of the control system may receive data indicative of certain properties of the agricultural vehicle and/or the implement (e.g., via the transceiver). In addition, data indicative of certain properties of the agricultural vehicle and/or the implement may be stored within the memory device of the controller. The controller may determine the swath acquisition path 18 based on the properties by the way of process 60.

In certain embodiments, the controller may receive data indicative of certain user preferences related to determining the swath acquisition path 18 and guiding the agricultural vehicle. For example, the user preferences may include an aggressiveness in acquiring the guidance swath and an overshoot of the agricultural vehicle with respect to the guidance swath after initially crossing the guidance swath. In these embodiments, the controller may determine the swath acquisition path 18 based on the properties of the agricultural vehicle and the implement and based on the acquired user preferences. For example, the controller may determine a target implement path based on a maximum turn rate of the agricultural implement, and the controller may determine the maximum turn rate of the agricultural implement based on the user input aggressiveness. The controller may then determine the swath acquisition path 18 based on the target implement path and the user input overshoot.

In the illustrated embodiment, the process 60 utilizes an implement dynamic model 62. The implement dynamic model 62 may receive dimensions 64 of the agricultural vehicle, dimensions 66 of the implement, a velocity/speed 68 of the agricultural vehicle/implement, and an agricultural vehicle turn rate 76. The process 60 utilizes the implement dynamic model 62 to determine a maximum implement turn rate 78 based on these inputs.

The dimensions 64 of the agricultural vehicle may include the length and width of the agricultural vehicle. The dimensions 66 of the implement may include the length and width of the implement and a distance between the hitch and the wheels of the implement. The velocity/speed 68 may include a current velocity of the agricultural vehicle/implement.

In certain embodiments, a turn rate calculator 74 may be used to determine the agricultural vehicle turn rate 76 based at least in part on a maximum vehicle turn rate 70 and an aggressiveness 72. The controller may receive the aggressiveness 72 via the user interface, as discussed in detail below. In certain embodiments, the maximum agricultural vehicle turn rate 70 corresponds to a maximum turn rate of the agricultural vehicle, e.g., during an initial turn of the agricultural vehicle toward the guidance swath. The turn rate calculator 74 may use the received maximum agricultural vehicle turn rate 70 and the aggressiveness 72 to determine the turn rate 76 of the agricultural vehicle.

In some embodiments, the aggressiveness 72 may correspond to a slew rate of the agricultural vehicle, the implement, or both, toward the guidance swath. In other embodiments, the aggressiveness 72 may correspond to a duration sufficient for the agricultural vehicle, implement, or both to acquire the guidance swath.

The agricultural vehicle turn rate 76 may be equal to or less than the maximum vehicle turn rate 70. For example, if a maximum aggressiveness is selected, the agricultural vehicle turn rate 76 may be equal to the maximum vehicle turn rate 70. Furthermore, a lower value of the aggressiveness 72 may result in a lower agricultural vehicle turn rate 76 than a higher value of the aggressiveness 72. The turn rate calculator 74 may utilize a relationship (e.g., linear relationship, exponential relationship, quadratic relationship, etc.) between aggressiveness and agricultural vehicle turn rate, an empirical formula, a lookup table, or a combination thereof, to facilitate determination of the agricultural vehicle turn rate 76 based on the maximum agricultural vehicle turn rate 70 and the aggressiveness 72. The process 60 may utilize the implement dynamic model 62 to determine the maximum implement turn rate 78 based in part on the agricultural vehicle turn rate 76.

An implement path creator model 80 may be used by the process 60 to determine a target implement path 82 based on the maximum implement turn rate 78 and a state 84 of the implement. In certain embodiments, the implement state 84 may include a location of the implement and an orientation/angle of the implement with respect to the guidance swath. For example, the orientation sensor and/or the spatial locating device may output signal(s) indicative of the implement state 84. The process 60 may utilize the implement path creator 80 to determine the target implement path 82 based at least in part on the maximum implement turn rate 78 and implement state 84 (e.g., utilizing kinematic equations).

In specific embodiments, the process 60 may use the implement path creator 80 to determine maximum implement curvature based on a velocity/speed obtained from implement state 84. The process 60 may also use the maximum implement turn rate 78 in determining the maximum implement curvature. The target implement path includes the maximum implement curvature for the greatest percentage of the target implement path that enables the implement to reach and align with the guidance swath using the least amount of time. For example, the process 60 may determine an initial turn rate of the target implement path towards the guidance swath based on the determined maximum implement curvature. Moreover, the target implement path is based on using the maximum implement turn rate 78 to reach the maximum curvature and transition from the maximum curvature to alignment with the guidance swath. As a result, the down track period for the implement may be reduced.

As discussed above, the maximum implement turn rate 78 may not be a true maximum turn rate of the agricultural vehicle because the maximum implement turn rate 78 is reduced if aggressiveness is less than the maximum. It should be appreciated that the terms "maximum" and "greatest" are the maximum/greatest values determined within the capabilities of the process and/or control system and may be less than the absolute maximum or greatest values.

As a result, the system may acquire guidance swath (e.g., reduce down track) more efficiently without the operator input. However, the operator may reduce the lateral load and increase the down track time by adjusting the aggressiveness and the overshoot. This may result in longer down track, increased comfort, and reduced lateral load.

An inverse dynamics model 88 may be used by the process 60 to determine the target agricultural vehicle path, referred to as the swath acquisition path 18, based on the target implement path 82. The inverse dynamics model 88 may also receive the agricultural vehicle state 86 and an adjusted overshoot 90. The agricultural vehicle state 86 may include a location of the agricultural vehicle and an orientation/angle of the agricultural vehicle with respect to the guidance swath. As illustrated, the agricultural vehicle state 86 and the implement state 84 are received at different block models in the process 60 of FIG. 3. In certain embodiments, the orientation sensor and/or the spatial locating device of the control system may facilitate determination of the agricultural vehicle state 86. The adjusted overshoot 90 may be received via a signal from the user interface, as discussed in detail below. The inverse dynamics model 88 may determine the swath acquisition path 18 based at least in part on the target implement path 82, the agricultural vehicle state 86 and the adjusted overshoot 90. The control system may then control the agricultural vehicle based on the swath acquisition path.

In certain embodiments, the operator may adjust the adjusted overshoot 90 to control the overshoot of the swath acquisition path, for example via the user interface. The adjusted overshoot 90 may vary the overshoot distance of the agricultural vehicle after initially crossing the guidance swath. That is, the operator may adjust or fine-tune the overshoot of the swath acquisition path by inputting the adjusted overshoot 90.

The inverse dynamics model 88 may use kinematic equations to determine the swath acquisition path using the received inputs. While the inverse dynamics model 88 receives the adjusted overshoot 90, the agricultural vehicle state 86, and the target implement path 82 in the illustrated embodiment, in other embodiments, the inverse dynamic model may receive different inputs or different combinations and/or variations of inputs to determine the swath acquisition path. In some examples, the agricultural vehicle state 86 may include a starting speed of the agricultural vehicle, a starting distance of the agricultural vehicle, a starting angle of the agricultural vehicle with respect to the guidance swath, and/or other related information about the state of the agricultural vehicle.

As mentioned above, the determined target implement path 82 facilitates determination of the swath acquisition path 18 via the inverse dynamics model 88. Automatically determining the swath acquisition path 18 via the process 60 may alleviate the operator's manual efforts to determine a swath acquisition path that brings the implement onto the guidance swath and aligns the implement with the guidance swath. The process 60 may also enable a user/operator to control the aggressiveness of the line acquisition approach by the way of input aggressiveness 72 and to fine tune the determined swath acquisition path 18 by way of the adjusted overshoot 90.

In the illustrated embodiment, the determined swath acquisition path 18 is output to a controller, as represented by block 94. The controller may correspond to the controller 32 disclosed above with reference to FIG. 2. The controller may be used to implement the swath acquisition path 18. For example, the controller may output signal(s) to one or more components of the control system (e.g., the speed control system, the steering control system, the implement control system/controller, etc.) indicative of instruction(s) to direct the agricultural vehicle along the swath acquisition path 18 to bring the implement 20 in-line with the guidance swath. The controller may also guide the agricultural vehicle along the guidance swath. While outputting the swath acquisition path to the controller of the control system of FIG. 2 is disclosed above, the swath acquisition path may be output to any other suitable control system/controller configured to facilitate directing the agricultural vehicle along the swath acquisition path.

In addition, the determined swath acquisition path 18 is output to an overshoot calculator 92. The overshoot calculator 92 may determine the overshoot based on the swath acquisition path to facilitate presentation of the overshoot to the operator. The overshoot calculator 92 may output signal(s) indicative of the overshoot to a display, such as the display 52 of the user interface 50 disclosed above with reference to FIG. 2. The display may then provide a visual representation of the overshoot to the operator, as discussed below with reference to FIG. 4. In addition, the process 60 may include outputting signal(s) indicative of the swath acquisition path 18 to the display, thereby enabling the display to present a visual representation of the swath acquisition path to the operator. In certain embodiments, the visual representation may also include the agricultural vehicle, the implement, the guidance swath, other suitable elements, or a combination thereof.

In certain embodiments, a user interface, such as the user interface 50 disclosed above with reference to FIG. 2, may enable the operator to enter the aggressiveness 72 and/or the adjusted overshoot 90 via a display. In other embodiments, the user interface may receive operator inputs via different components, such as the knob(s), keypad(s), etc. The visual representation of the guidance swath may enable the operator to adjust the determined swath acquisition path 18 by controlling the aggressiveness 72 and/or fine-tuning the adjusted overshoot 90. For example, the control system 22 may determine the swath acquisition path 18 and provide near-real time or real time visual representation of the swath acquisition path 18. In some embodiments, the operator may accept or approve the swath acquisition path, as visually presented, via input to the user interface. Upon receiving a signal indicative of acceptance/approval, the controller may output signal(s) indicative of instruction(s) to move the agricultural vehicle along the swath acquisition path 18. An example of a visual representation of the swath acquisition path provided by the process 60 is presented in FIG. 4 below.

Figure 4:
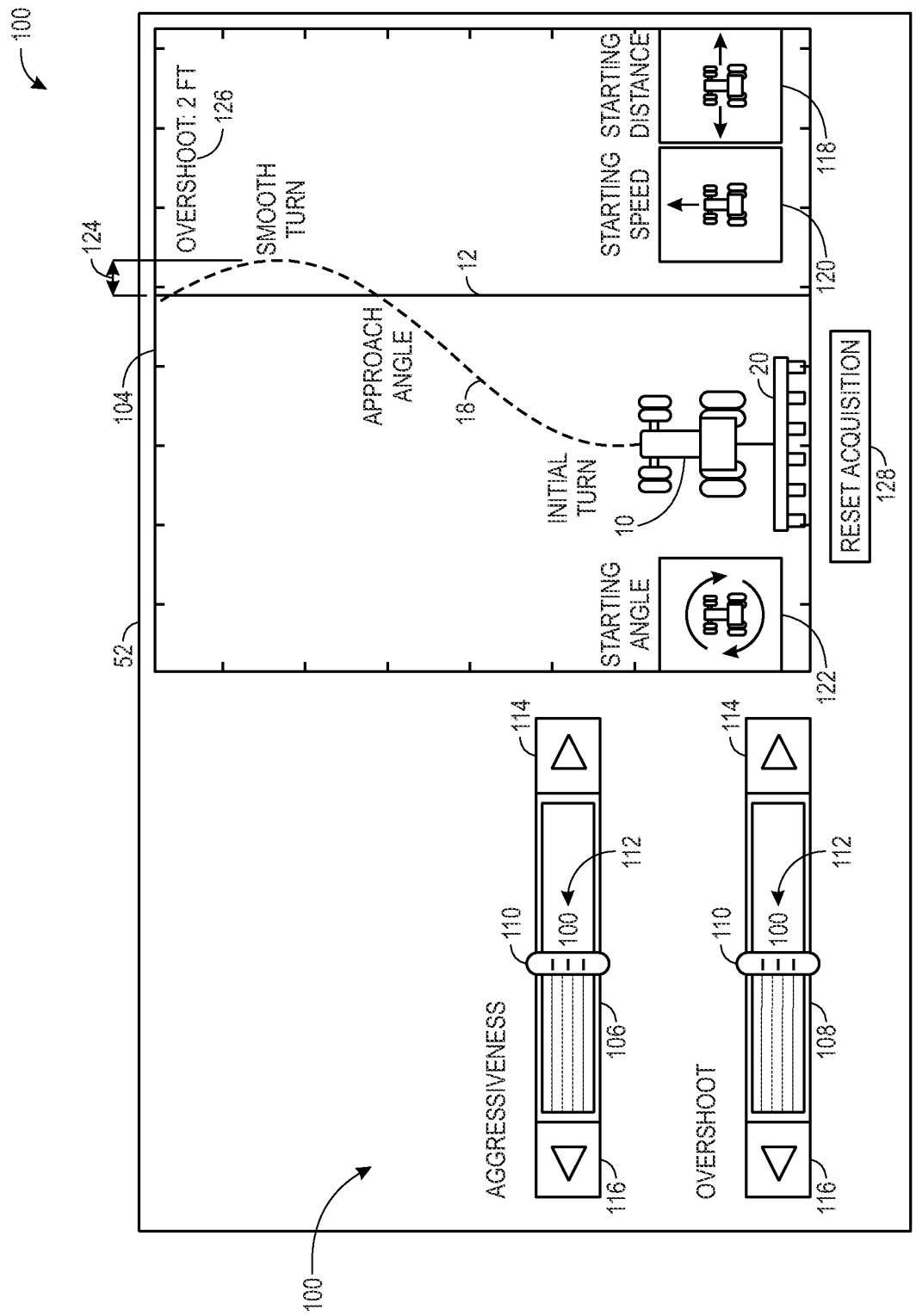
FIG. 4 is a diagram of an embodiment of a display that may be employed within a user interface of the control system of FIG. 2.

FIG. 4 is a diagram of an embodiment of a display 52 that may be employed within the user interface of the control system of FIG. 2. In the illustrated embodiment, the display 52 is configured to present a visual representation 100 of values of the swath acquisition parameters within a swath acquisition parameter section 102 and to present a graphical representation of the swath acquisition path 18 within a path visualization section 104 of the display 52. While the swath acquisition parameter section 102 is to the left of the path visualization section 104 in the illustrated embodiment, in other embodiments, the swath acquisition parameter section 102 and/or the path visualization section 104 may be in any suitable location on the display 52. In the illustrated embodiment, the display 52 is a touch sensitive display. Accordingly, the values of the swath acquisition parameters may be adjusted via interaction with the display 52. However, in alternative embodiments, the user interface may include other controls (e.g., switches, button, knobs, etc.) configured to enable an operator to adjust the values of the swath acquisition parameters.

In the illustrated embodiment, the swath acquisition parameter section 102 includes an aggressiveness control 106 and an overshoot control 108. The aggressiveness control 106 may control a value of the aggressiveness parameter within the process disclosed above with reference to FIG. 3. The overshoot control 108 may control a value of the overshoot parameter within the process disclosed above with reference to FIG. 3.

As illustrated, the aggressiveness control 106 and the overshoot control 108 each include a virtual slider 110 configured to adjust the value of the respective parameter. Moreover, each control includes a numerical representation 112 of the value of the respective parameter. To adjust the value of each parameter, the respective slider 110 may be moved along a slider path. As the slider moves, the numerical representation 112 of the respective parameter changes based on the position of the slider 110 along the slider path. Each slider 110 may be moved by direct interaction, or by selecting an increase value arrow 114 or a decrease value arrow 116. While each control includes a slider and a numeric representation of the parameter value in the illustrated embodiment, in other embodiments, other control(s) and/or representation(s) of the parameter value may be displayed. For example, in certain embodiments, each control may include a virtual knob, a virtual dial, a field in which a number may be entered by a virtual keypad, or a combination thereof, among other input techniques. In addition, in certain embodiments, each control may include a graphical representation (e.g., a graph, a dial, etc.) of the value of the respective parameter. Furthermore, in certain embodiments, the parameter adjustment input/control may be positioned remote from the visual representation of the respective parameter.

In the illustrated embodiment, the path visualization section 104 of the display 52 includes a graphical representation of the swath acquisition path 18 and a graphical representation of the guidance swath 12. The path visualization section 104 also includes a graphical representation of the agricultural vehicle 10 and the agricultural implement 20. As illustrated, the graphical representation of the agricultural vehicle 10 and the agricultural implement 20 is positioned remote from the graphical representation of the guidance swath 12, indicating that the agricultural vehicle 10 and the agricultural implement 20 are positioned remote from the guidance swath.

In certain embodiments, the distance between the agricultural vehicle 10 and the guidance swath 12 may be manually entered (e.g., via a virtual numeric keypad) by depressing the "starting distance" virtual button 118. In addition, the initial speed of the agricultural vehicle 10/implement 20 (e.g., the speed of the agricultural vehicle 10/implement 20 before initiation of the swath acquisition process) may be manually entered (e.g., via a virtual numeric keypad) by depressing the "starting speed" virtual button 120. Furthermore, the angle between the initial agricultural vehicle path (e.g., the agricultural vehicle path before initiation of the swath acquisition process) and the guidance swath may be manually entered (e.g., via a virtual numeric keypad) by depressing the "starting angle" virtual button 122. Because the values may be manually entered, the operator may enter current values, expected values, test/example values, or a combination thereof. Furthermore, while the virtual buttons are located at the bottom of the path visualization section 104 of the display 52 in the illustrated embodiment, in other embodiments, the virtual buttons may be located in any other suitable portion of the display.

In further embodiments, the distance between the agricultural vehicle 10 and the guidance swath 12, the initial speed of the agricultural vehicle 10/implement 20 (e.g., the speed of the agricultural vehicle/implement before initiation of the swath acquisition process), the angle between the initial agricultural vehicle path (e.g., the agricultural vehicle path before initiation of the swath acquisition process) and the guidance swath, or a combination thereof, may be determined by the controller (e.g., based on input from the spatial locating device and/or the orientation sensor). In such embodiments, the virtual buttons may be omitted, or the virtual buttons may enable the operator to manually override the values determined by the controller.

While the illustrated embodiment includes virtual buttons for "staring distance", "starting speed", and "starting angle", in other embodiments, the display may present a subset of the virtual buttons and/or other/additional virtual buttons. For example, in certain embodiments, the display may present a "starting curvature" button that enables an operator to input the initial turning radius of the agricultural vehicle 10. Additionally or alternatively, the controller may be configured to automatically determine other and/or additional starting parameters, such as the initial turning radius of the agricultural vehicle 10. Once the value(s) of the starting parameter(s) are manually input (e.g., using the virtual buttons) or determined, the controller may instruct the display to position the graphical representation of the agricultural vehicle 10 in the corresponding location and orientation within the path visualization section 104 of the display 52.

In the illustrated embodiment, the controller determines the swath acquisition path based at least in part on the starting parameter(s) and the swath acquisition path parameter(s) input via the controls in the swath acquisition parameter section 102 of the display 52. The controller 22 then outputs a signal to the display indicative of instructions to present the swath acquisition path, and the display 52 displays the graphical representation of the swath acquisition path 12 in the path visualization section 104 of the display 52.

The swath acquisition path 18 includes an initial turn to an approach angle. In the illustrated embodiment, the "initial turn" and "approach angle" are labeled on the graphical representation of the swath acquisition path 18. The rate of the initial turn may be determined by the turn rate calculator, as discussed above with respect to the process of FIG. 3. The inverse dynamics model may be used to determine the approach angle (e.g., the angle between the initial path of the agricultural vehicle 10 and the path toward the guidance swath 12) as part of the determination of the swath acquisition path 18.

The swath acquisition path 18 also includes a swath turn (e.g., turn toward the guidance swath 12). In the illustrated embodiment, the "swath turn" is labeled on the graphical representation of the swath acquisition path 18. The inverse dynamics model may be used to determine the rate of the swath turn as part of the determination of the swath acquisition path 18.

In some embodiments, the control system may determine the overshoot 124 (e.g., the distance the agricultural vehicle 10 overshoots the guidance swath 12 before returning to the guidance swath 12) using the properties of the agricultural vehicle/implement and the aggressiveness by way of the process disclosed above with reference to FIG. 3. In such embodiments, the operator may adjust the overshoot 124 using the overshoot control 108. In other embodiments, the overshoot may be manually input via the overshoot control 108.

The initial turn rate may be determined to reduce the time associated with acquisition of the guidance swath and to control the lateral load on the agricultural vehicle 10. For example, a higher initial turn rate may reduce the guidance swath acquisition duration and increase the lateral load on the agricultural vehicle 10 and the implement 20. In addition, a lower initial turn rate may increase the guidance swath acquisition duration and reduce the lateral load on the agricultural vehicle 10 and the implement 20. Accordingly, the initial turn rate may be determined to balance the guidance swath acquisition duration with a desired lateral load. As previously discussed, the initial turn rate is limited by the capabilities of the agricultural vehicle 10 and the implement 20 (e.g., maximum turn angle of the wheels/tracks, configuration of the implement and/or hitch assembly, etc.).

The approach angle may be determined to reduce the distance traveled between the initial agricultural vehicle position and the guidance swath and to provide a smooth transition between segments of the swath acquisition path. For example, a steeper approach angle may reduce the distance traveled between the initial agricultural vehicle position and the guidance swath 12, and increase the swath turn angle. In addition, a shallower approach angle may increase the distance traveled between the initial agricultural vehicle position and the guidance swath, and reduce the swath turn angle. Accordingly, the approach angle may be determined to balance the distance traveled between the initial agricultural vehicle position and the guidance swath 12 with the swath turn angle. Furthermore, when the agricultural vehicle 10 is moving at a higher speed, the control system may determine a shallower approach angle to reduce the lateral load on the agricultural vehicle at the initial turn and at the swath turn (e.g., due to an increased radius of curvature at the turns). In addition, when the agricultural vehicle 10 is moving at a lower speed, the control system may determine a steeper approach angle to reduce the distanced traveled between the initial agricultural vehicle position and the guidance swath 12.

The swath turn rate may be determined to reduce the duration associated with acquisition of the guidance swath 12 and to control the lateral load on the agricultural vehicle 10. For example, a higher swath turn rate may reduce the guidance swath acquisition duration and increase the lateral load on the agricultural vehicle 10 and the implement 20. In addition, a lower swath turn rate may increase the guidance swath acquisition duration and reduce the lateral load on the agricultural vehicle 10 and the implement 20. Accordingly, the swath turn rate may be determined to balance the guidance swath acquisition duration with the desired lateral load. As previously discussed, the swath turn rate is limited by the capabilities of the agricultural vehicle 10 and the implement 20 (e.g., maximum turn angle of the wheels/tracks, configuration of the implement and/or hitch assembly, etc.). In certain embodiments, the control system may acquire aggressiveness from the operator using the visual representation 100.

In certain embodiments, the control system may be configured to determine an expected maximum lateral load during the initial turn and/or during the swath turn. In such embodiments, the control system may be configured to output a signal to the display 52 indicative of instructions to present a visual indication of the maximum lateral load (e.g., via a numerical value, a gauge, etc.). As a result, the effect of adjusting the aggressiveness and/or the overshoot on the lateral load may be visualized, and, in certain embodiments, the effect of adjust the initial turn rate and/or the swath turn rate may be visualized.

Furthermore, the overshoot may be adjusted to control the duration associated with acquisition of the guidance swath 12 by the implement 20 coupled to the agricultural vehicle 10. For example, the control system may determine a smaller overshoot when the agricultural vehicle 10 is not towing an agricultural implement 20 or when the agricultural vehicle 10 is towing a smaller/more maneuverable implement 20. In addition, the control system may determine a larger overshoot when the agricultural vehicle 10 is towing a larger/less maneuverable implement 20. As previously discussed, the overshoot corresponds to the maximum distance the agricultural vehicle 10 overshoots the guidance swath 12 before returning to the guidance swath 12.

In the illustrated embodiment, the display 52 includes a "reset acquisition" virtual button 90. Depressing the "reset acquisition" virtual button resets the overshoot to the value determined by the control system via the process disclosed above with reference to FIG. 3, and resets the aggressiveness to a default value (e.g., corresponding to the slider being positioned in the center of the slider path). After resetting the acquisition, the operator may readjust the controls to achieve the desired swath acquisition path.

To establish a desired swath acquisition path 18, the operator may adjust the aggressiveness control 106 and/or the overshoot control 108. As the operator adjust the controls, the graphical representation of the swath acquisition path 18 automatically changes based on the updated parameter(s). Once the operator finds the swath acquisition path acceptable, the operator may engage automatic guidance (e.g., via the user interface), thereby sending a signal to the controller indicative of acceptance of the value(s) of the swath acquisition parameter(s). The controller then controls the agricultural vehicle 10 based at least in part on the swath acquisition parameter(s), thereby directing the agricultural vehicle 10 along the desired swath acquisition path 18.

The graphical representation of the swath acquisition path 18 corresponds to a swath acquisition path determined by the controller of the control system. In certain embodiments, the controller is configured to determine the swath acquisition path 18 by simulating movement of the agricultural vehicle 10 and the implement 20 using a guidance algorithm (e.g., including guidance, navigation, and control algorithm(s), a numerical integrator, etc.). In addition, the controller is configured to control the agricultural vehicle 10 using the guidance algorithm to move the implement 20 into alignment with the guidance swath 12. Because the same guidance algorithm is used to simulate movement of the agricultural vehicle 10 and implement 20 and to control movement of the agricultural vehicle 10, the accuracy of the graphical representation of the swath acquisition path 18 may be enhanced, as compared to using separate guidance algorithms for simulation and control.

While the display 52 presents the aggressiveness control 106 and the overshoot control 108 in the illustrated embodiment, in other embodiments, the display may present only one of these controls. In further embodiments, the display may present other and/or additional controls, such as a swath turn rate control, an approach angle control, an initial turn rate control, a swath acquisition path length control, an angular acceleration of one or more turns control, other suitable control(s), or a combination thereof. While the controller determines the swath acquisition path 18 and controls the agricultural vehicle 10 (e.g., directs the agricultural vehicle 10 along the swath acquisition path 18) based at least in part on the aggressiveness and the overshoot, in certain embodiments, the controller may determine the swath acquisition path and control the agricultural vehicle 10 based at least in part on only one of the aggressiveness or the overshoot, and/or based at least in part on other swath acquisition parameter(s). For example, in certain embodiments, the controller may determine the swath acquisition path 18 and control the agricultural vehicle 10 and, in certain embodiments, the implement 20 based at least in part on one or more of overshoot, aggressiveness, swath turn rate, approach angle, initial turn rate, and other swath acquisition parameter(s).

In certain embodiments, the controller may determine the swath acquisition path 18 and control the agricultural vehicle 10 and, in certain embodiments, the implement 20 based at least in part on the capabilities and/or dimensions of the agricultural vehicle 10 and/or the agricultural implement 20. For example, the swath acquisition path 18 may be determined and the agricultural vehicle 10 and, in certain embodiments, the implement 20 may be controlled based at least in part on the dimensions of the agricultural vehicle 10, the dimensions of the agricultural implement 20, the position and type of wheels/tracks on the agricultural implement 20 (e.g., caster wheels/tracks, non-caster wheels/tracks, steerable wheels/tracks, etc.), the type/configuration of the hitch assembly coupling the agricultural implement 20 to the agricultural vehicle 10, the maximum steering rate of the agricultural vehicle 10, the minimum turn radius of the agricultural vehicle 10, or a combination thereof, among other vehicle/implement parameter(s). In addition, the controller may determine the swath acquisition path and control the agricultural vehicle, and, in certain embodiments, the implement based at least in part on field condition(s), weather condition(s), field topography, or a combination thereof, among other external parameter(s).

While the agricultural vehicle 10 moves in a forward direction along the swath acquisition path 18 to the guidance swath 12 in the illustrated embodiment, in other embodiments the agricultural vehicle 10 may also move in a rearward direction along the swath acquisition path 18 to the guidance swath 12. For example, the controller may determine a swath acquisition path 18 that extends from the initial position of the implement 20 rearward to the guidance swath 12, and the controller may instruct the agricultural vehicle 10 to move along the rearward swath acquisition path to the guidance swath 12. Upon reaching the guidance swath 12, the agricultural vehicle 10 may continue in the rearward direction or move in a forward direction along the guidance swath 12. In certain embodiments, the user interface may include a control, and/or the display 52 may include a virtual control that enables the operator to select whether the controller determines a forward or rearward swath acquisition path and directs the agricultural vehicle 10 to move in a forward or rearward direction toward the guidance swath 12.

In certain embodiments, the display may include an "accept parameters" virtual control (e.g., virtual button, etc.), and/or the user interface may include an "accept parameters" control (e.g., button, etc.). In such embodiments, actuating the control/virtual control induces the user interface to output a signal to the controller indicative of acceptance of the swath acquisition parameters. Upon engagement of automatic guidance, the controller controls the agricultural vehicle 10 such that the agricultural vehicle 10 moves along the swath acquisition path established by the accepted parameters. In certain embodiments, with automatic guidance active, actuating the "accept parameters" control/virtual control induces the user interface to output a signal to the controller indicative of instructions to update the swath acquisition parameter(s) such that the agricultural vehicle 10 is directed along an updated swath acquisition path that is based on the updated parameter(s). In addition, while the graphical representation of the swath acquisition path 18 automatically changes in response to actuating the swath acquisition parameter control(s) in the illustrate embodiment, in certain embodiments, the graphical representation of the swath acquisition path 18 may not be updated until the user depresses an "update" button on the user interface or an "update" virtual button on the display 52.

In certain embodiments, the controller may be configured to instruct the display 52 to present multiple graphical representations of swath acquisition paths. For example, the controller may instruct the display 52 to present a graphical representation of a first swath acquisition path 18 based on default/determined value(s) of the parameter(s) and a graphical representation of a second swath acquisition path based on the current value(s) of the parameter(s). Displaying multiple graphical representations of swath acquisition paths may enable the operator to compare multiple swath acquisition paths to facilitate determination of the desired value(s) of the parameter(s).

In certain embodiments, the controller may enable the operator to save parameter value(s) associated with a swath acquisition path. For example, if an operator adjusts the value(s) of the parameter(s) and establishes a desired swath acquisition path for a certain agricultural vehicle (e.g., floater, harvester, combine, etc.) or for a certain agricultural vehicle/agricultural implement combination (e.g., tractor and planter, tractor and tillage tool, etc.), the operator may save the value(s) of the parameter(s) (e.g., by depressing a "save parameter(s)" button on the user interface or a "save parameter(s)" virtual button on the display). In certain embodiments, the user interface may enable the operator to associate the saved parameter value(s) with an agricultural vehicle or an agricultural vehicle/agricultural implement combination. Accordingly, during a subsequent swath acquisition process, the operator may load the saved parameter value(s) for the agricultural vehicle or for the agricultural vehicle/agricultural implement combination (e.g., by depressing a "load parameter(s)" button on the user interface or a "load parameter(s)" virtual button on the display), thereby reducing the duration associated with establishing the desired swath acquisition path. The parameter value(s) may be saved within and/or loaded from the controller (e.g., the memory of the controller) in response to input from the user interface.

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A controller comprising a memory and a processor, wherein the controller is configured to:
   determine a maximum implement curvature of an implement based on a speed of the implement and a maximum implement turn rate of the implement, wherein the implement is configured to be towed by an agricultural vehicle;
   determine a target implement path from a current position of the implement to a guidance swath based on the maximum implement curvature, wherein the determined target implement path is configured to align the implement with the guidance swath at an end of the determined target implement path, and the determined target implement path includes the maximum implement curvature for a greatest percentage of the determined target implement path that enables the implement to reach and align with the guidance swath;
   determine a swath acquisition path of the agricultural vehicle from a current position of the agricultural vehicle to the guidance swath based on the determined target implement path, wherein the swath acquisition path is configured to align the implement with the guidance swath at an end of the swath acquisition path; and
   control the agricultural vehicle based on the swath acquisition path.

2. The controller of claim 1, wherein the determined target implement path includes an initial turn from an initial orientation of the implement to the maximum implement curvature at the maximum implement turn rate, the determined target implement path includes a swath turn from the maximum implement curvature to a final orientation of the implement substantially aligned with the guidance swath at the maximum implement turn rate, or a combination thereof.

3. The controller of claim 1, wherein the controller is configured to determine the maximum implement turn rate using an implement dynamic model, and the implement dynamic model is configured to use dimensions of the agricultural vehicle, dimensions of the implement, a speed of the agricultural vehicle, a turn rate of the agricultural vehicle, or a combination thereof, to determine the maximum implement turn rate.

4. The controller of claim 3, wherein the controller is configured to determine the turn rate of the agricultural vehicle using a turn rate calculator, and the turn rate calculator is configured to use a maximum agricultural vehicle turn rate of the agricultural vehicle and an aggressiveness to acquire the guidance swath to determine the turn rate of the agricultural vehicle.

5. The controller of claim 4, wherein the controller is configured to receive a user input indicative of the aggressiveness from a user interface.

6. The controller of claim 4, wherein the aggressiveness correspond to a slew rate to reach and align with the guidance swath.

7. The controller of claim 4, wherein the aggressiveness correspond to a duration to reach and align with the guidance swath.

8. The controller of claim 1, wherein the controller is configured to determine the target implement path to the guidance swath using an implement path creator model, the implement path creator model is configured to use the maximum implement turn rate and an initial implement state to determine the target implement path, and the initial implement state includes the current position of the implement and the speed of the implement.

9. The controller of claim 1, wherein the controller is configured to determine the swath acquisition path using an inverse dynamics model, the inverse dynamic model uses kinematic equations, the determined target implement path, and an initial state of the agricultural vehicle to determine the swath acquisition path, and the initial state of the agricultural vehicle includes the current position of the agricultural vehicle.

10. The controller of claim 9, wherein the swath acquisition path includes an overshoot of the guidance swath, and the overshoot corresponds to a maximum distance the agricultural vehicle overshoots the guidance swath before returning to the guidance swath.

11. The controller of claim 10, wherein the controller is configured to receive a signal indicative of the overshoot from a user interface.

12. The controller of claim 10, wherein the controller is configured to determine the overshoot while determining the swath acquisition path, the controller is configured to receive a signal indicative of an adjustment to the overshoot from a user interface, and the controller is configured to update the swath acquisition path based on the adjustment to the overshoot.

13. A controller comprising a memory and a processor, wherein the controller is configured to:
   determine a maximum implement turn rate of an implement using an implement dynamic model, wherein the implement dynamic model is configured to use dimensions of an agricultural vehicle, dimensions of the implement, a speed of the agricultural vehicle, and a turn rate of the agricultural vehicle, or a combination thereof, to determine the maximum implement turn rate, and wherein the implement is configured to be towed by the agricultural vehicle;
   determine a target implement path from a current position of the implement to a guidance swath using an implement path creator model based on the maximum implement turn rate, wherein the implement path creator model is configured to use the maximum turn rate of the implement and an initial state of the implement to determine the target implement path, the target implement path is configured to align the implement with the guidance swath at an end of the target implement path, and the initial state of the implement includes the current position of the implement;
   determine a swath acquisition path using an inverse dynamic model, wherein the inverse dynamic model uses kinematic equations, the determined target implement path, and an initial state of the agricultural vehicle to determine the swath acquisition path, wherein the initial state of the agricultural vehicle includes the speed of the agricultural vehicle, and the swath acquisition path is configured to align the implement with the guidance swath at an end of the swath acquisition path; and
   control the agricultural vehicle based on the swath acquisition path.

14. The controller of claim 13, wherein the controller is configured to determine the target implement path using the implement path creator model by determining a maximum implement curvature of the implement based on the speed of the implement and the maximum implement turn rate, wherein the determined target implement path includes the maximum implement curvature for a greatest percentage of the determined target implement path that enables the implement to reach and align with the guidance swath.

15. The controller of claim 13, wherein the controller is configured to determine the turn rate of the agricultural vehicle using a turn rate calculator, and the turn rate calculator is configured to use a maximum agricultural vehicle turn rate of the agricultural vehicle and an aggressiveness to acquire the guidance swath to determine the turn rate of the agricultural vehicle.

16. The controller of claim 13, wherein the swath acquisition path includes an overshoot of the guidance swath, the overshoot corresponds to a maximum distance the agricultural vehicle overshoots the guidance swath before returning to the guidance swath, the controller is configured to determine the overshoot while determining the swath acquisition path using the inverse dynamic model, the controller is configured to receive a signal indicative of an adjustment to the overshoot from a user interface, and the controller is configured to update the swath acquisition path based on the adjustment to the overshoot.

17. A method of controlling an agricultural vehicle comprising:
   determining, via a controller having a memory and a processor, a maximum implement curvature of an implement based on a speed of the implement and a maximum implement turn rate of the implement, wherein the implement is configured to be towed by an agricultural vehicle;
   determining, via the controller, a target implement path from a current position of the implement to a guidance swath based on the maximum implement curvature, wherein the determined target implement path is configured to align the implement with the guidance swath at an end of the determined target implement path, and the determined target implement path includes the maximum implement curvature for a greatest percentage of the determined target implement path that enables the implement to reach and align with the guidance swath;
   determining, via the controller, a swath acquisition path of the agricultural vehicle from a current position of the agricultural vehicle to the guidance swath based on the determined target implement path, wherein the swath acquisition path is configured to align the implement with the guidance swath at an end of the swath acquisition path; and controlling, via the controller, the agricultural vehicle based on the swath acquisition path.

18. The method of claim 17, comprising determining, via the controller, the maximum implement turn rate using an implement dynamic model, wherein the implement dynamic model is configured to use dimensions of the agricultural vehicle, dimensions of the implement, a speed of the agricultural vehicle, a turn rate of the agricultural vehicle, or a combination thereof, to determine the maximum implement turn rate.

19. The method of claim 17, wherein the determining the swath acquisition path comprises determining an overshoot of the guidance swath based on the determined target implement path and an initial state of the agricultural vehicle, wherein the overshoot corresponds to a maximum distance the agricultural vehicle overshoots the guidance swath before returning to the guidance swath, and the initial state of the agricultural vehicle includes the current position of the agricultural vehicle.

20. The method of claim 19, wherein the overshoot is initially determined using an inverse dynamic model, the overshoot is adjustable by a user using a user interface, and the inverse dynamic model is configured to adjust the swath acquisition path based on the adjusted overshoot.

\* \* \* \* \*